Dec. 27, 1949 A. E. LITTLE 2,492,386
SHEET SORTING DEVICE
Filed May 4, 1945 13 Sheets-Sheet 2

Inventor:
Alfred E. Little
By Zabel and Gritzbaugh
Attorneys

Dec. 27, 1949   A. E. LITTLE   2,492,386
SHEET SORTING DEVICE
Filed May 4, 1945   13 Sheets-Sheet 3
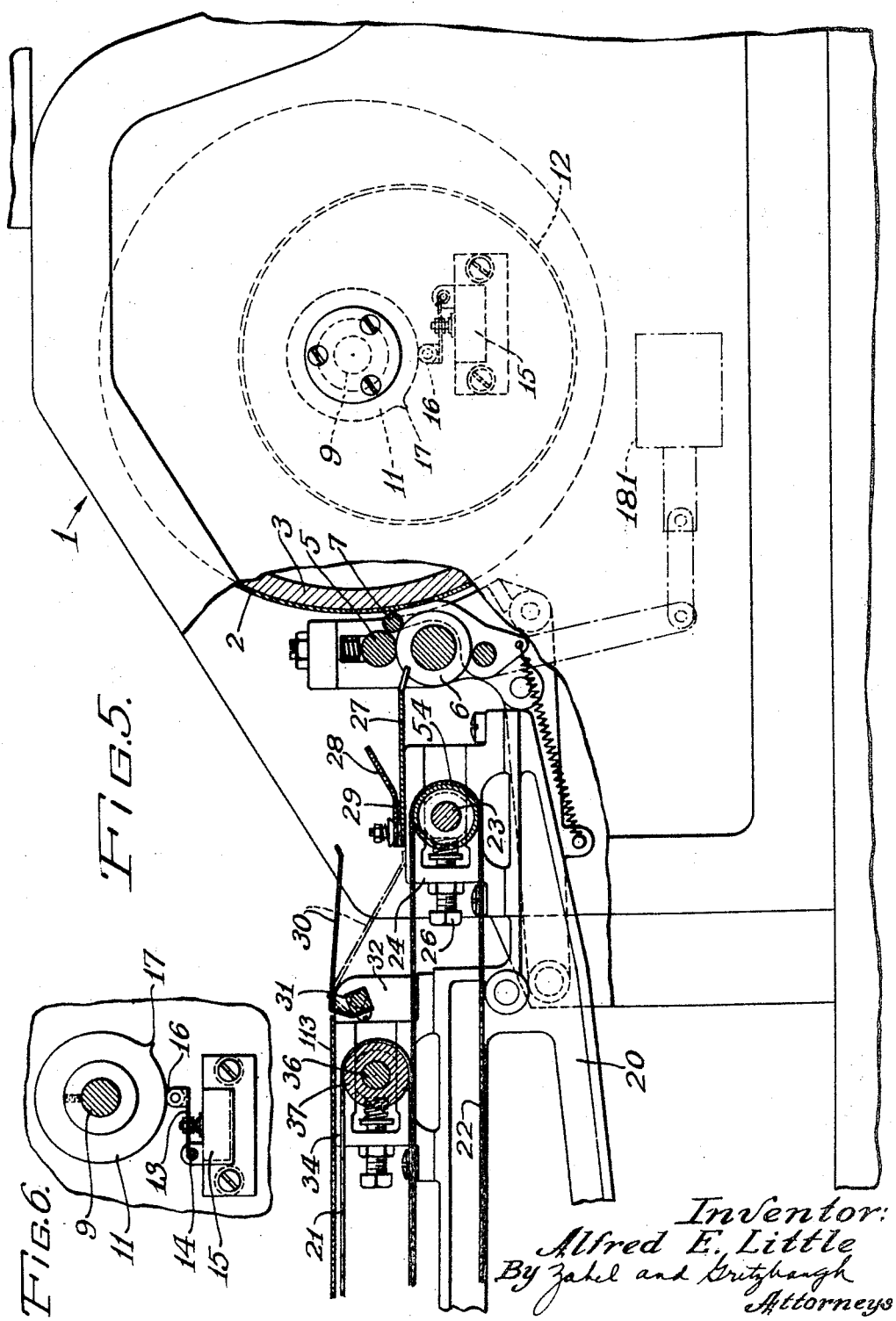
Inventor:
Alfred E. Little
By Zabel and Fitzhugh
Attorneys

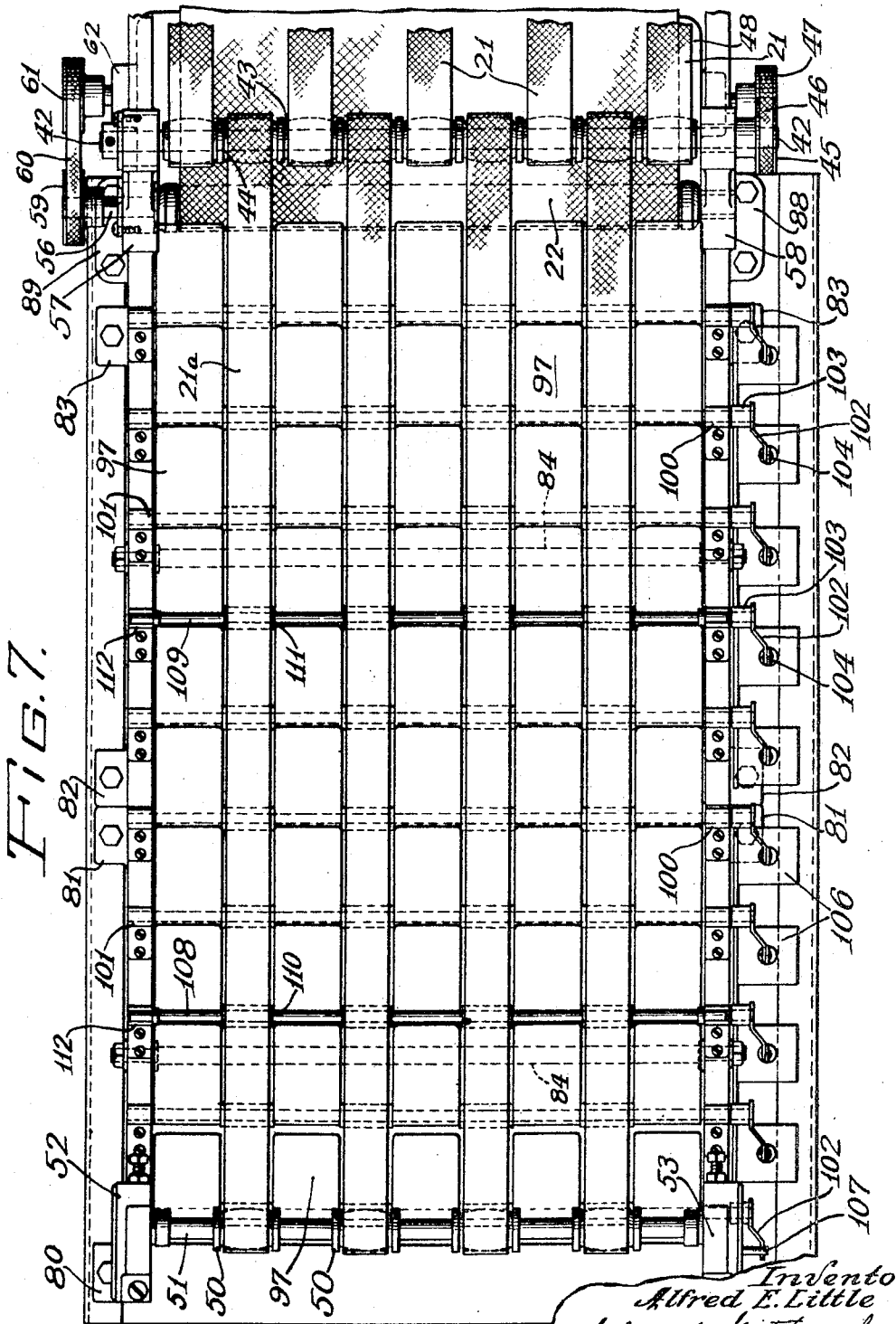

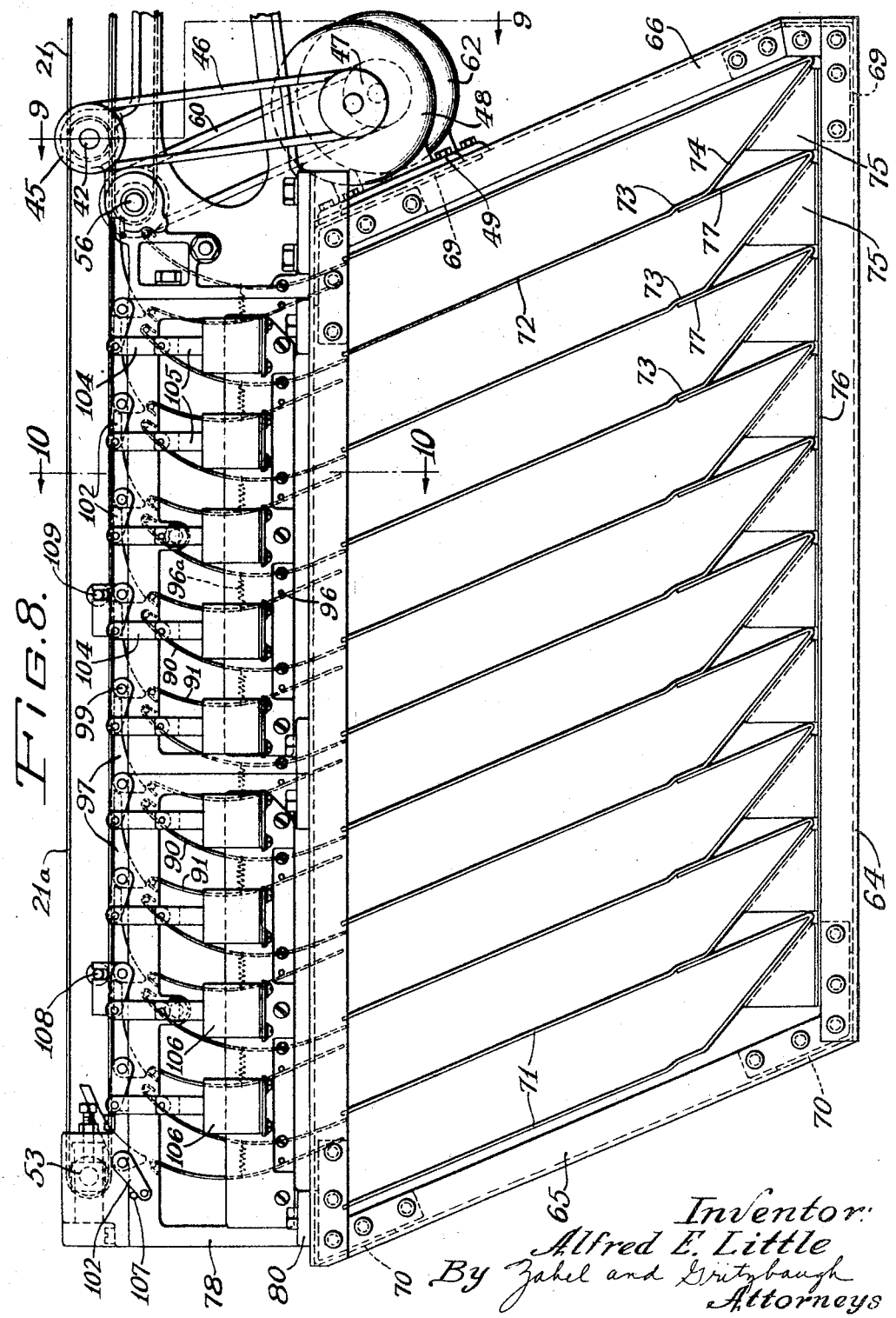

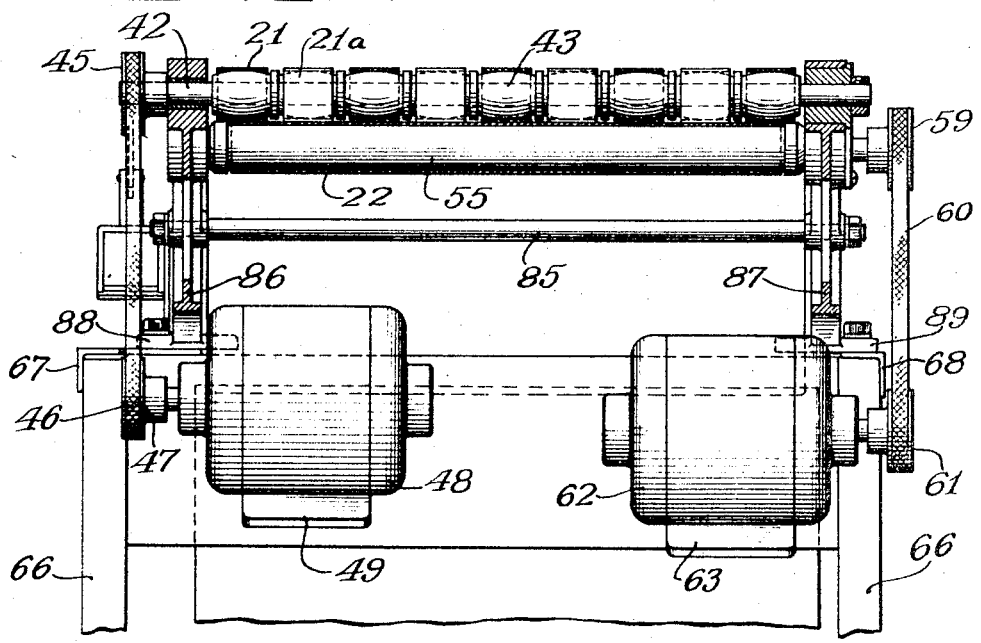
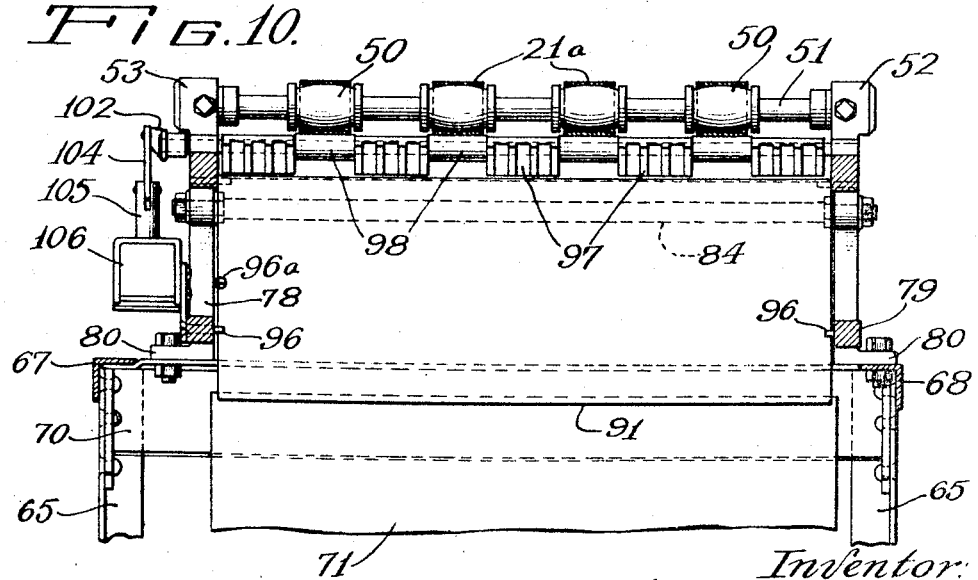

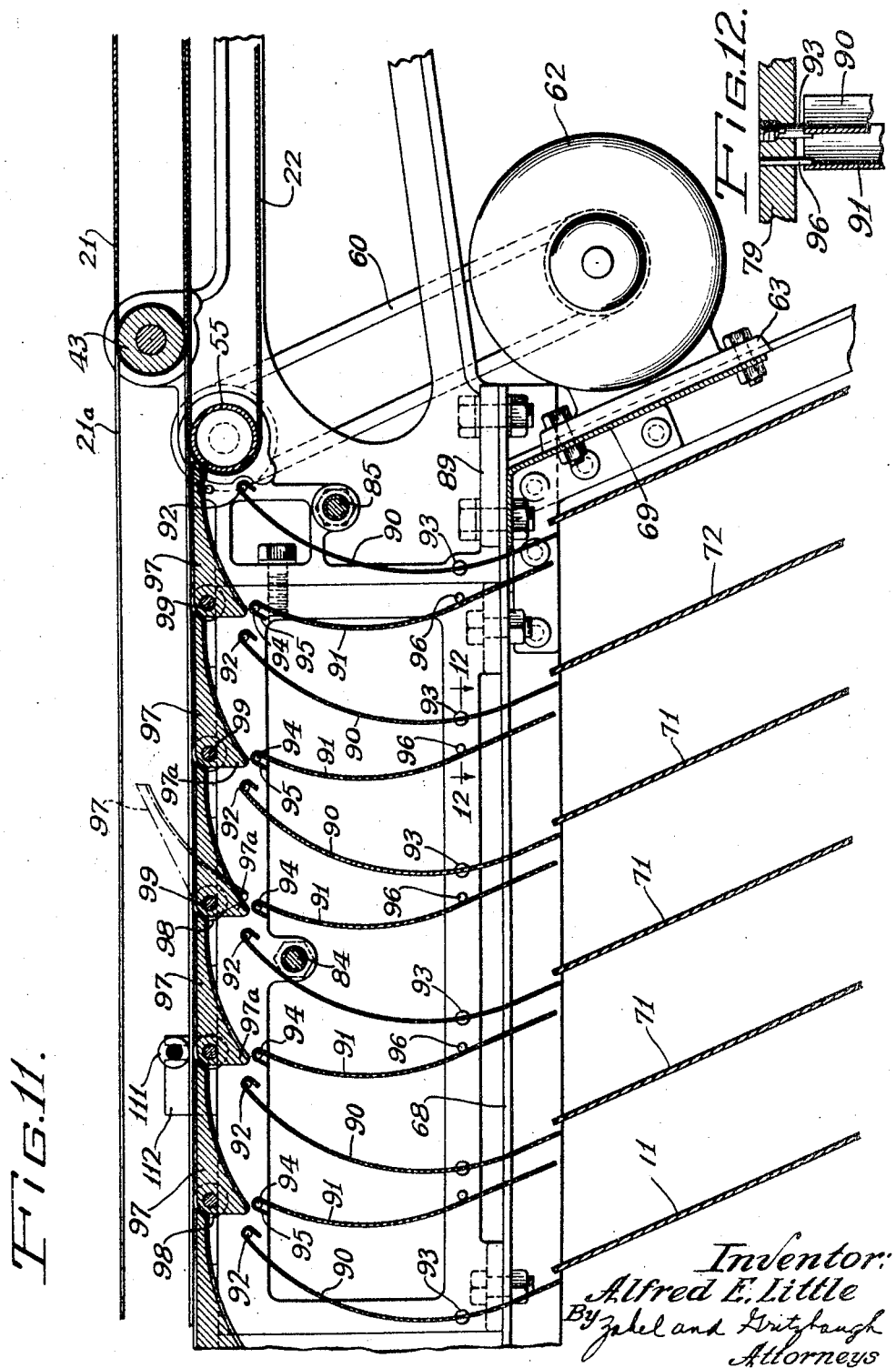

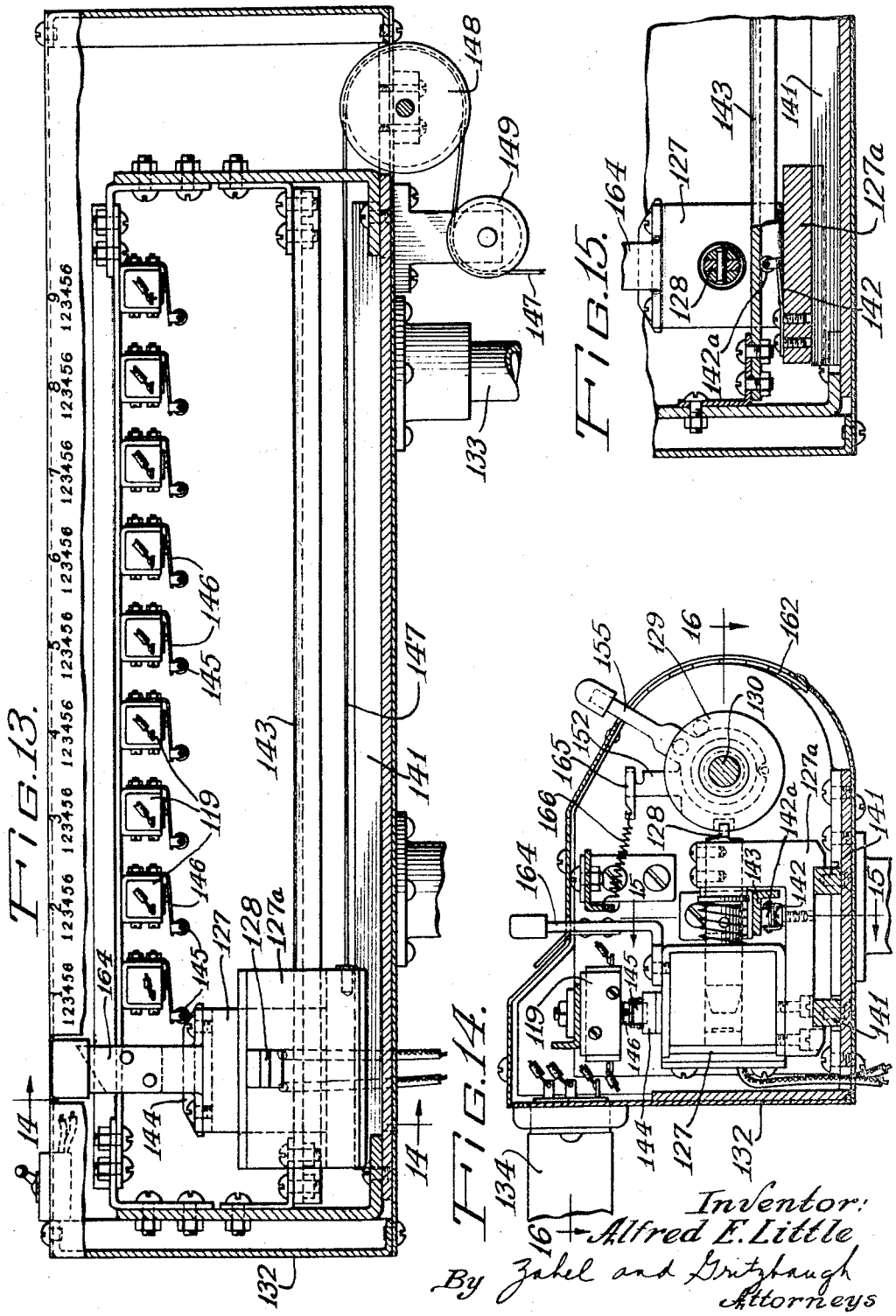

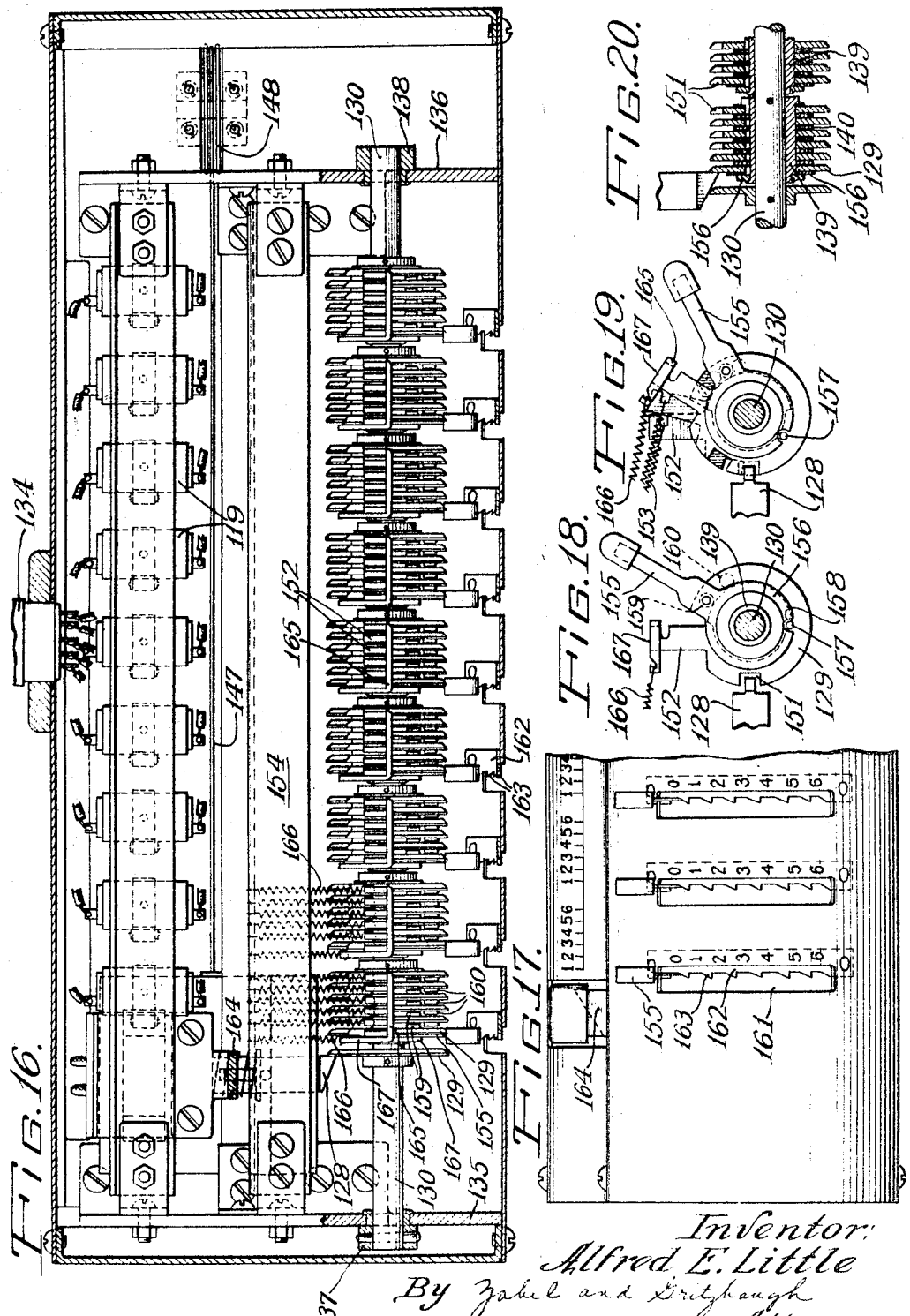

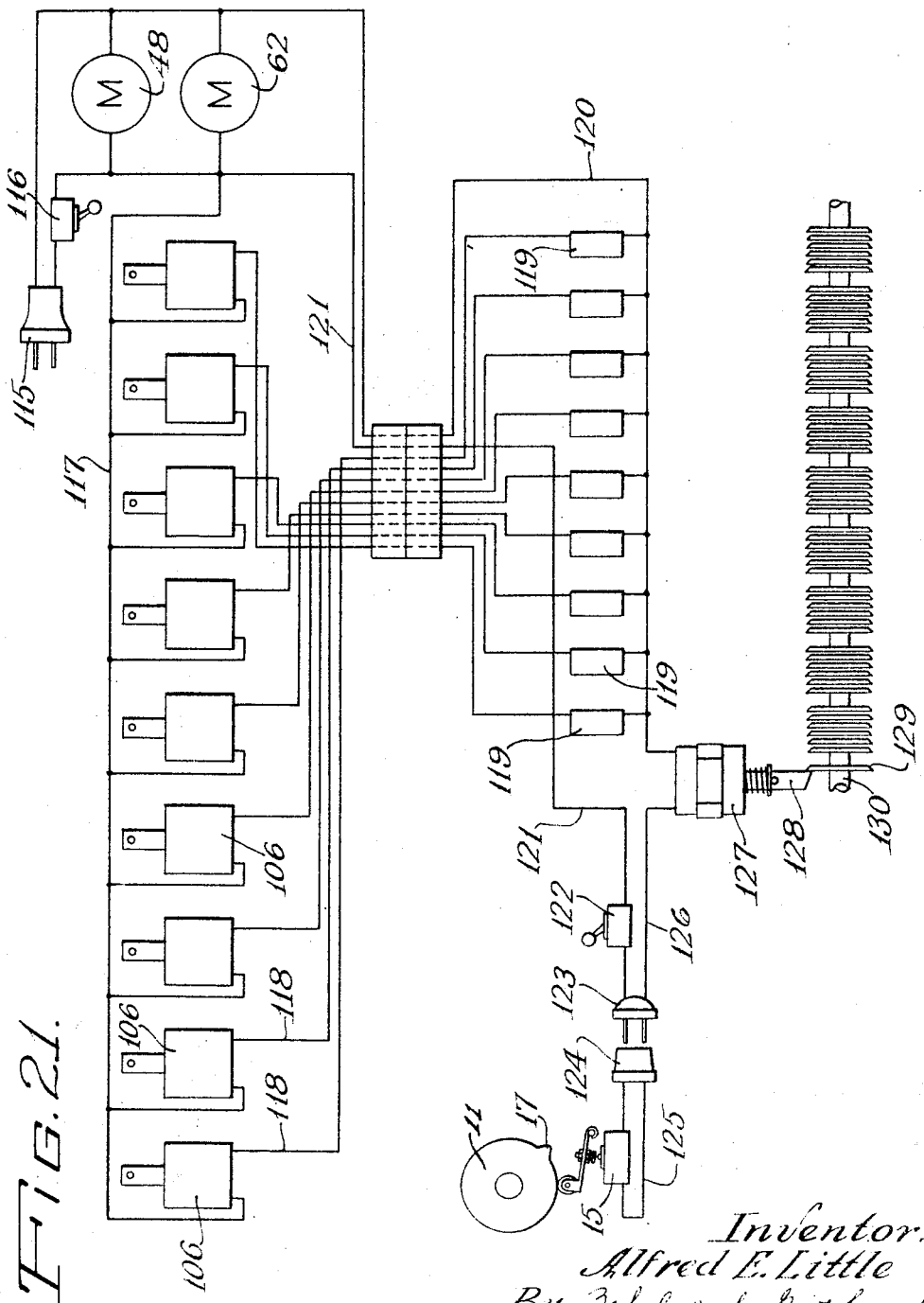

Dec. 27, 1949 A. E. LITTLE 2,492,386
SHEET SORTING DEVICE
Filed May 4, 1945 13 Sheets-Sheet 11
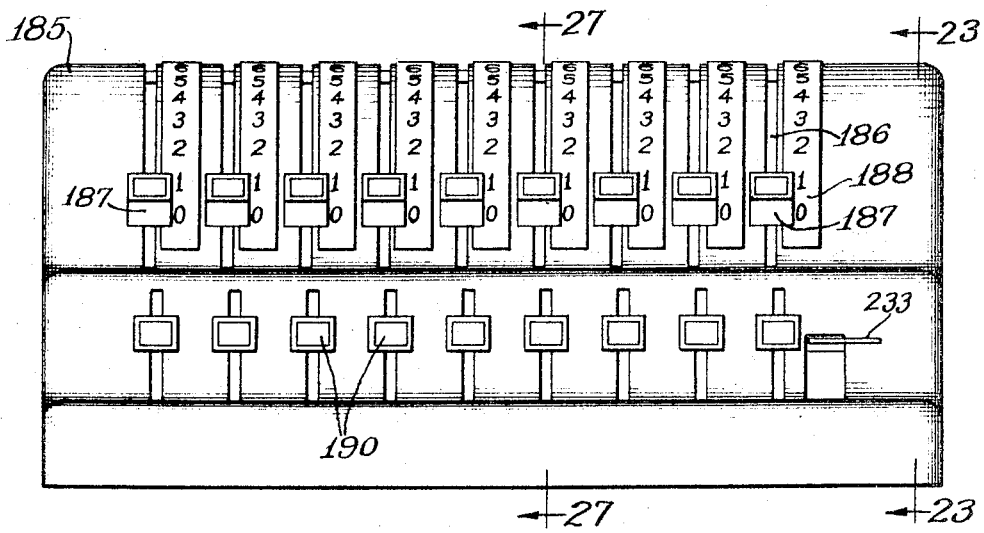
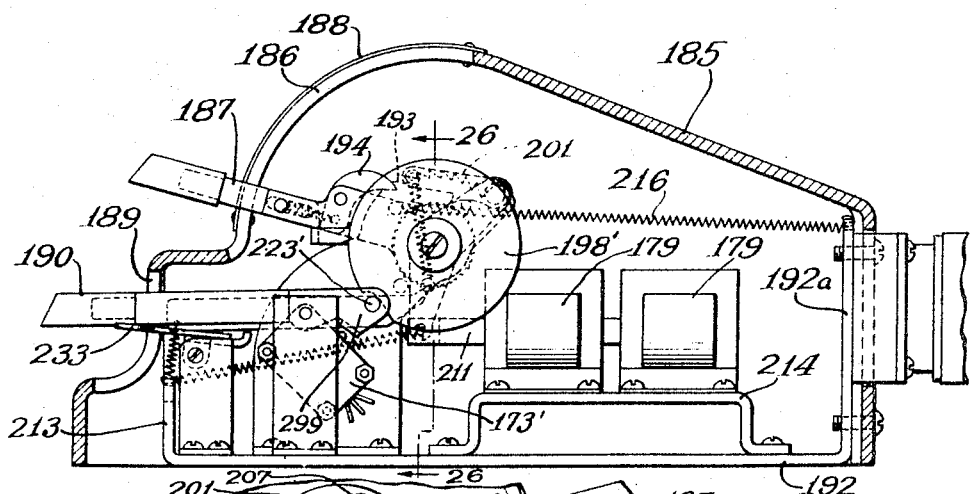
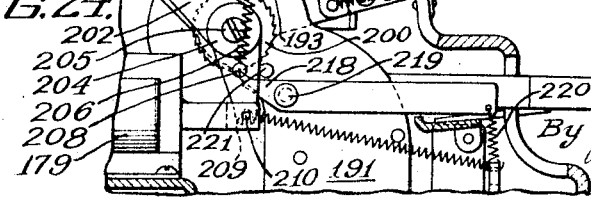
Inventor:
Alfred E. Little
By Zabel and Gritzbaugh
Attorneys Dec. 27, 1949  A. E. LITTLE  2,492,386
SHEET SORTING DEVICE
Filed May 4, 1945  13 Sheets-Sheet 12
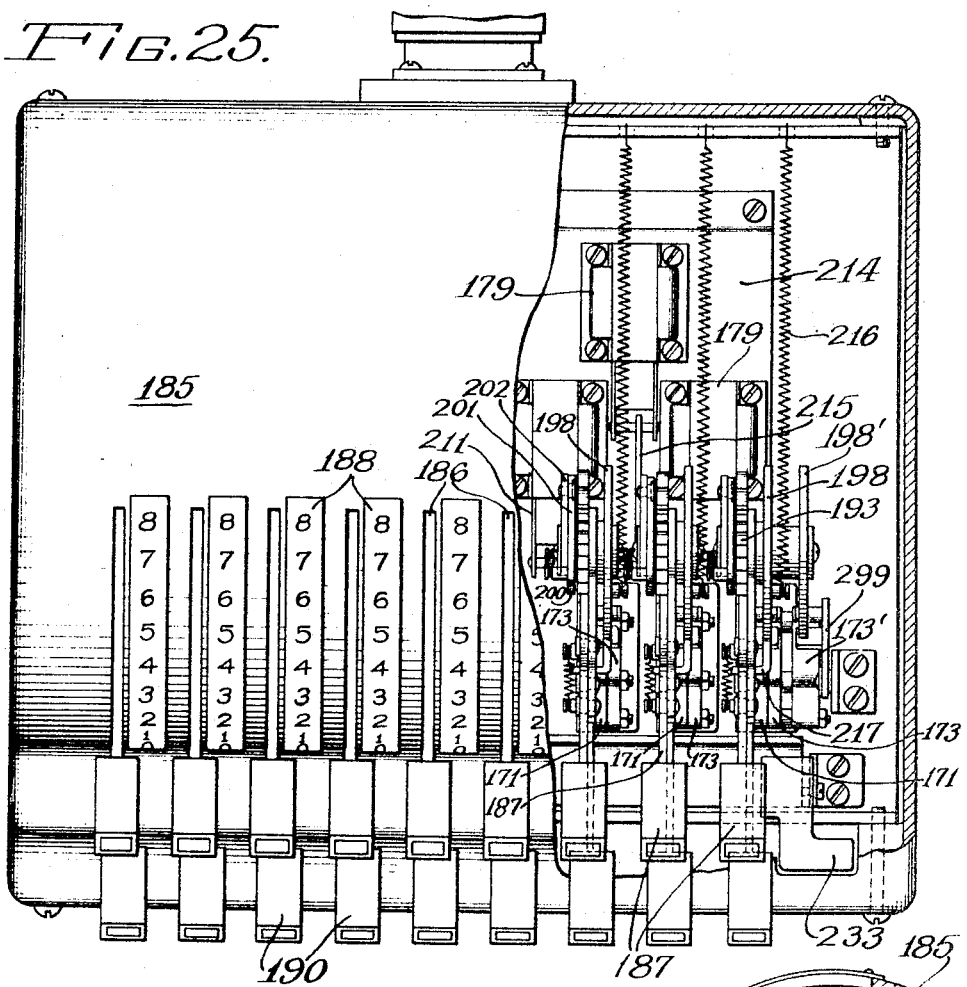
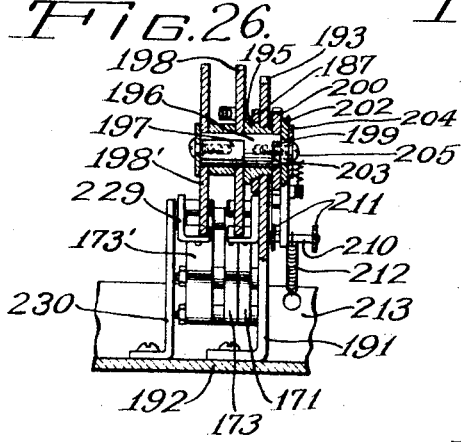
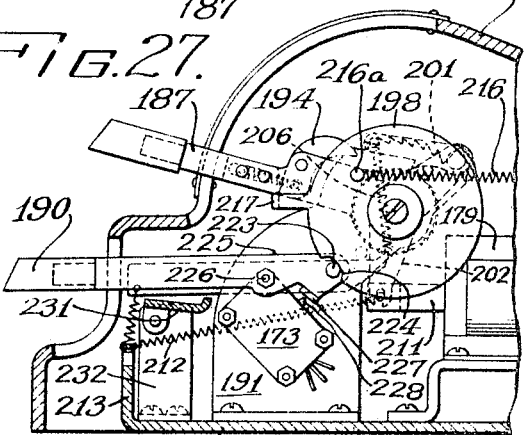
Inventor:
Alfred E. Little
By Zahel and Gritzbaugh
Attorneys

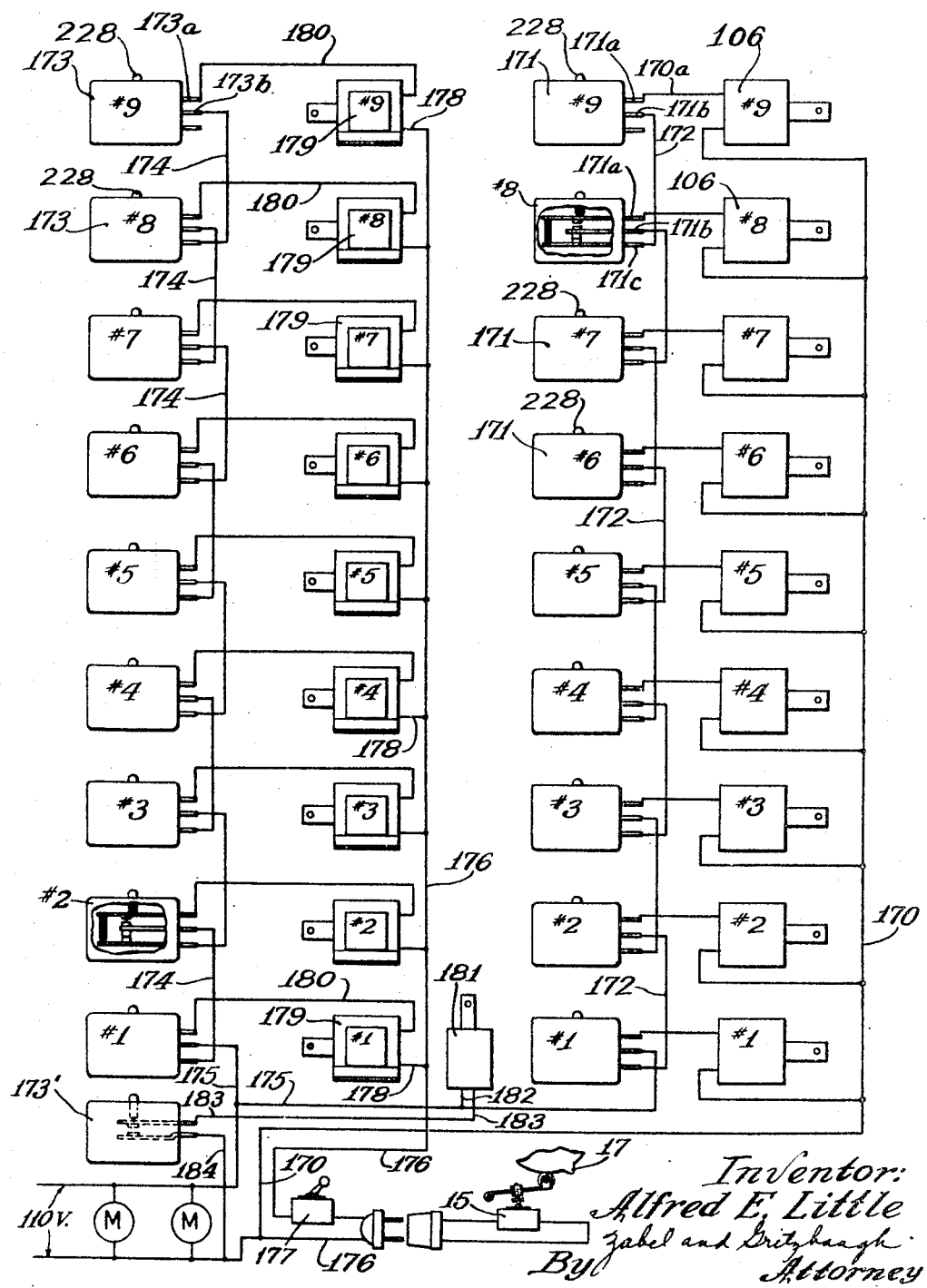

Patented Dec. 27, 1949

2,492,386

UNITED STATES PATENT OFFICE 2,492,386

SHEET SORTING DEVICE

Alfred E. Little, Chicago, Ill., assignor to Ditto, Incorporated, Chicago, Ill., a corporation of West Virginia Application May 4, 1945, Serial No. 591,976

4 Claims. (Cl. 271—64)

The present invention relates to sheet sorting devices which are adapted selectively to place a desired number of sheets received from a duplicating machine or like apparatus in separate containers or supports. The device is of the type wherein any desired number of sheets may be placed in any desired compartment by a device which may be set in advance by the operator. It is the purpose of this invention to provide a novel conveying and receiving unit for the sheets to be segregated whereby the sheets are easily and accurately directed to the proper container without danger of injury to the sheets.

It is a further purpose of my invention to provide a novel selecting arrangement whereby sheets are directed into the compartments with the minimum amount of bending of the sheets. This device is intended particularly to be used with duplicating machines of the hectograph and the so called wet process type wherein the sheets as received from the duplicating machines are moist on one side so that there is a tendency for them to curl. The present apparatus is so equipped as to minimize the curling of the sheets as they are received in the storage compartments. It is a further purpose of my invention to provide a machine of this character with novel means whereby a sheet may be deflected from the sorting device in the position to be extracted by the operator at any time. It is a further purpose of my invention to provide a novel selector circuit for a sorter of this type whereby the operator may pre-select the number of copies to be placed in a particular compartment and may thereafter change the selection, at will, to vary the number of copies to be delivered to a particular compartment anytime before the actual completion of the delivery.

It is a further purpose of the invention to provide a selecting device and circuit wherein the parts are relatively simple and few in number.

The nature and advantages of the invention will appear more fully from the following description and the accompanying drawings wherein a preferred form of the invention is shown. It is to be understood however that the drawings and description are illustrative only and are not to be taken as limiting the invention except insofar as it is limited by the claims.

In the drawings:

Figure 5 is a view partly in side elevation and partly in section according to the line 5—5 of Figure 2;

Figure 6 is a fragmentary sectional view taken on the line 6—6 of Figure 2;

Figure 7 is a plan view of the sorter;

Figure 8 is a view in side elevation of the sorter;

Figure 9 is a sectional view taken on the line 9—9 of Figure 8;

Figure 10 is a sectional view taken on the line 10—10 of Figure 8;

Figure 11 is a longitudinal sectional view through a portion of the sorter to illustrate the interior construction;

Figure 12 is a fragmentary sectional view taken on the line 12—12 of Figure 11;

Figure 13 is a longitudinal sectional view through the pre-selector mechanism;

Figure 14 is a sectional view taken on the line 14—14 of Figure 13;

Figure 15 is a fragmentary sectional view taken on the line 15—15 of Figure 14;

Figure 16 is a sectional view taken on the line 16—16 of Figure 14;

Figure 17 is a fragmentary view in side elevation of the pre-selecting hectograph mechanism;

Figures 18 and 19 are fragmentary detail views illustrating the operation of a manual selector lever associated with the selector units;

Figure 20 is a fragmentary sectional view taken longitudinally through one of the selector units;

Figure 21 is a wiring diagram illustrating the electrical connections of the selector device for the control of the various compartments in the sorter;

Figure 22 is a view in side elevation of a modified form of selector device;

Figure 23 is a sectional view taken on the line 23—23 of Figure 22;

Figure 24 is a fragmentary view similar to Figure 23 but looking in the opposite direction;

Figure 25 is a plan view partly in section of the device shown in Figure 22;

Figure 26 is a sectional view taken on the line 26—26 of Figure 23;

Figure 27 is a sectional view taken on the line 27—27 of Figure 22; and

Figure 28 is a wiring diagram of the mechanism shown in Figures 22 to 27 inclusive.

Figure 1:
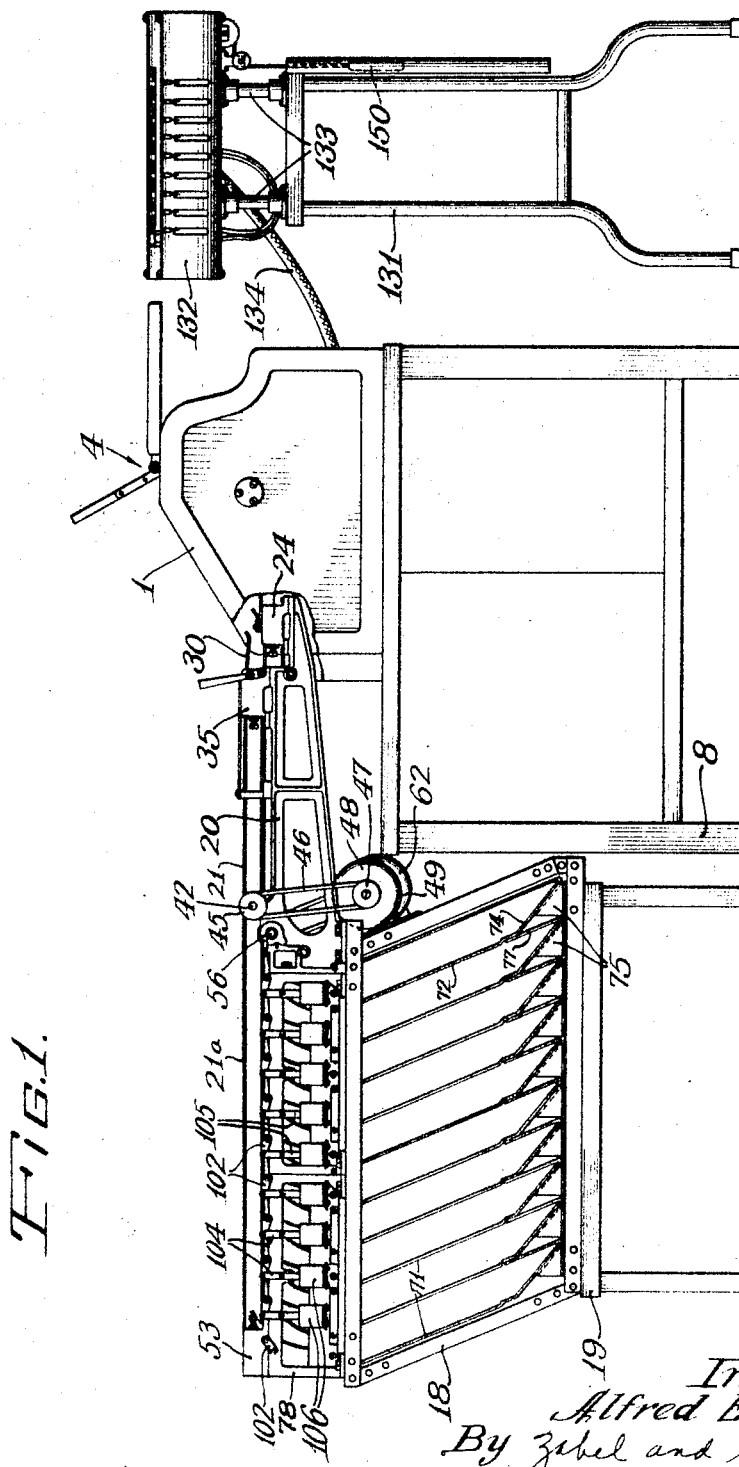
Figure 1 is a view in side elevation of a sorting device embodying my invention showing the device attached to a duplicating machine of the hectograph type with a separate unit embodying the selecting mechanism.
Figure 2:
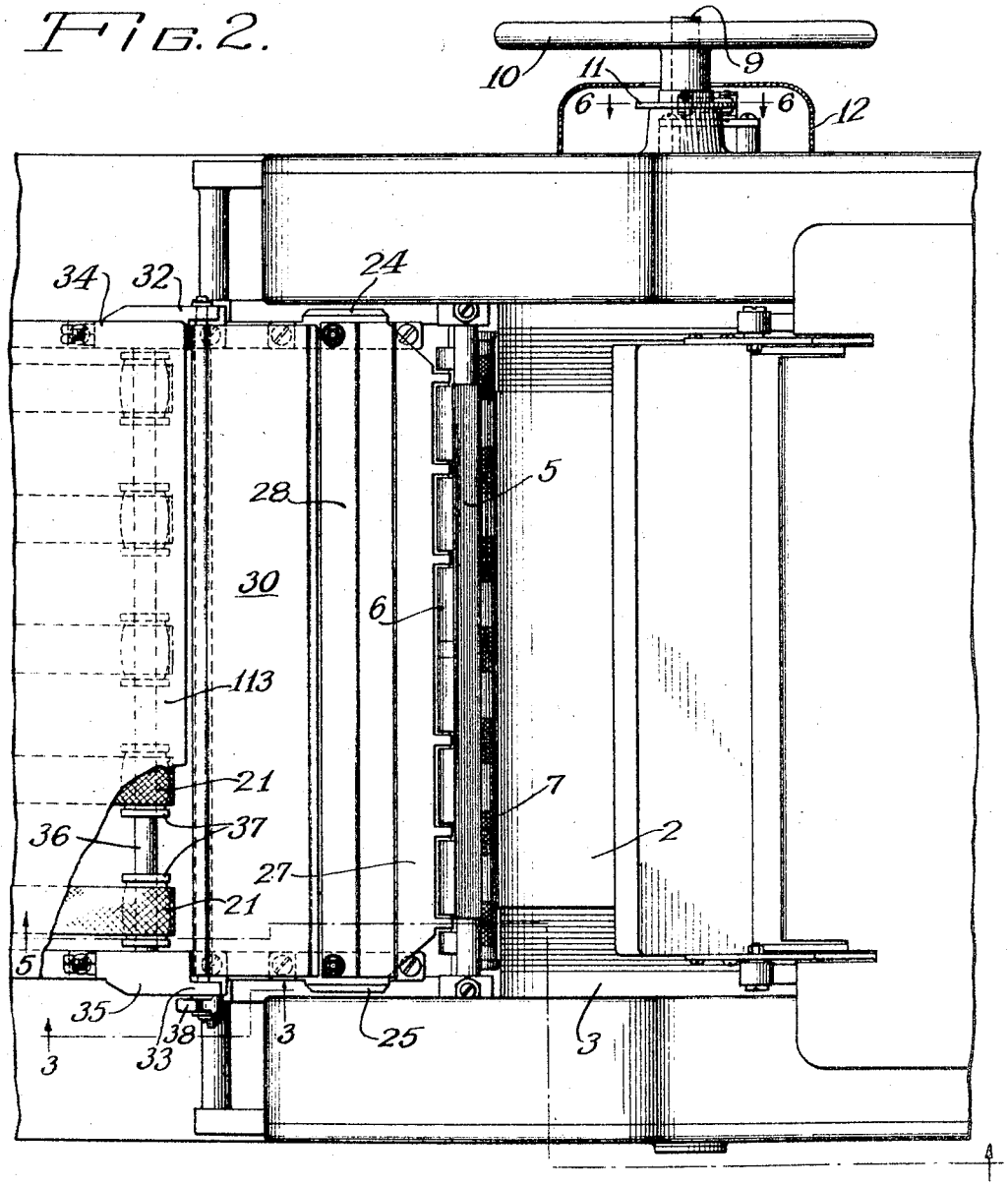
Figure 2 is a fragmentary plan view looking down on the duplicating machine and showing the connection of the sorter to the duplicating machine.
Figure 3:
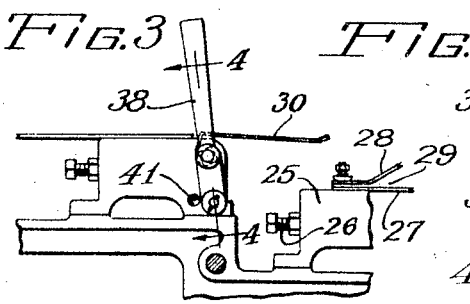
Figure 3 is a fragmentary sectional view taken on the line 3—3 of Figure 2.
Figure 4:
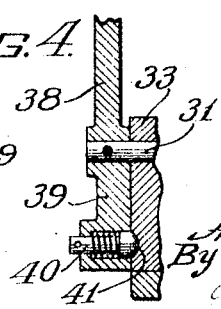
Figure 4 is a sectional view taken on the line 4—4 of Figure 3.

Referring now to the drawing and particularly to Figures 1–6, my invention is shown as applied to a duplicating machine 1 of the hectograph type wherein a gelatin band 2 is positioned on a drum 3 and copy sheets are fed from a feed tray 4 to the drum where they receive an imprint from a master impression in reverse on the gelatin band. The copy sheets are stripped from the drum by means of stripping rollers 5 and 6, the leading edges of the sheets being fed to the stripping rollers by a roller 7 that moves into and out of the peripheral outline of the drum in timed relation to the movement of the drum. The drum is of the general type shown in the Marchev Patent 2,033,383. The duplicator as shown is mounted upon a stand 8 which may have storage space therein for hectograph rolls and for paper. The duplicating machine is power operated and it has a shaft 9 for the drum upon which a handwheel 10 is secured. The handwheel 10 can be utilized to turn the drum by hand as desired for adjusting purposes. The shaft 9 also carries a cam 11 which is located inside a housing 12 on the side frame of the duplicating machine. The cam 11 is a switch operating cam. It is adapted to periodically depress a contact closing lever 13 that is pivoted at 14 on the exterior of a switch casing 15. A roller 16 is provided on the lever 13 and the cam 11 has a trip projection 17 thereon adapted to engage the roller 16 one time for each revolution of the shaft 9.

My improved sorter comprises a frame 18 which is mounted on a suitable support 19 adjacent the support 8. The frame 18 has a conveyer frame 20 projecting from one end thereof toward the drum and into close juxtaposition to the stripping rollers 5 and 6. The conveyer frame 20 carries upper and lower belt conveyers 21 and 22. The upper conveyer is terminated short of the lower conveyer adjacent to the stripping rollers so that sheets carried from the stripping rollers by the lower conveyer may be removed before they are fed to engagement with the upper conveyer.

At the front end of the lower conveyer there is a roller shaft 23, the opposite ends of which are mounted in two bearing blocks 24 and 25 in such fashion that the shaft may be adjusted lengthwise of the frame 20 by means of adjusting screws 26 (see Figure 5) for keeping the conveyer belts 22 properly tight. The stripping rollers 5, 6 and 7 deliver sheets from the drum 3 over a guide plate 27 and beneath a second removably mounted guide plate 28. These guide plates are mounted on the bearing blocks 24 and 25 and extend between the bearing blocks to provide a narrow throat at 29 through which the sheets pass into position to be engaged by the conveyer 22. Wrinkled or torn sheets are caught in the throat 29 and can be removed by the operator. The sheets are directed onto the conveyer 22 or away from it by a movable separator plate 30 which is fixed to a cross bar 31. The cross bar 31 is mounted at its opposite ends on two brackets 32 and 33 which form parts of two bearing blocks 34 and 35 for a shaft 37 that carries rollers 37 for the conveyer belts 21. The bar 31 is journalled in the brackets 32 and 33 and extends through the bracket 33 where it is provided with a hand lever 38 (see Figures 2, 3 and 4). The hand lever 38 is provided with an extension 39 which carries a spring pressed detent 40 adapted to engage in depressions 41 that are provided in the side face of the bearing block 35. The hand lever 38 can thus be used to raise or lower the plate 30 and effectively direct sheets to or away from the conveyer 22.

Referring now to Figures 7 to 11 inclusive and particularly to Figures 8, 9 and 11, the detailed construction of the driving means for the conveyers 21 and 22 will be described. The conveyer 21 is in two sections; a front section 21 and a rear section 21a, both sections of which are driven by a shaft 42, which has pulley sections 43 and 44 thereon. The shaft 42 has a drive pulley 45 thereon. This pulley is connected by a belt 46 to a pulley 47 that is mounted on the shaft of a motor 48. The motor 48 is supported on a bracket 49 that is bolted to the frame 18. The pulleys 44 and 43 drive the conveyer belt members 21a and 21 respectively. The conveyer belt members 21a extend rearwardly to a series of pulleys 50 which are mounted on a shaft 51. The shaft 51 is journalled in bearing blocks 52 and 53. These bearing blocks are adjustable to tighten the conveyer belts 21a whenever it is necessary to do so.

The conveyer section 22 is composed of a single wide belt, one end of which is carried upon a roller 54 on the shaft 23 and the other end of which is carried upon a roller 55 that is mounted on a shaft 56 which is journalled in two bearing blocks 57 and 58. The shaft 56 is driven by a pulley 59, a belt 60, a pulley 61 and a motor 62. The motor 62 has its base 63 bolted to a portion of the frame 18 as illustrated clearly in Figure 11 of the drawings.

Referring now to the framework 18, this framework comprises a base portion 64 made of angle iron. At the rear of the frame there are angle irons 65, and similar angle irons 66 are provided at the front of the frame. The top of the frame comprises two angle irons 67 and 68 (see Figure 10), and they are connected by cross tie plates 69 at their front ends. There are rear tie plates 70 which also connect the rear angle irons 65 together. In between the front and rear frame members the framework 18 is provided with a series of partitions 71, there being as many of these partitions as the sorter is equipped to handle divisions of sheets. As shown there are nine partitions 71 and an additional partition 72 which is slightly different in construction because it is the front partition. These partitions are made of sheet material such as sheet metal and are shaped as illustrated best in Figure 8 of the drawings, so that each partition nests with the adjacent one to form a continuous series of pockets. The partition 72 has a front and a back wall, the back wall being offset as indicated at 73 and then sloped at 74 toward the front wall. The sloping partition 74 of the back wall has a supporting bracket 75 welded thereon and this supporting bracket is adapted to rest on a floor plate 76 of the framework 18. The partitions 71 are similar to the partitions 72, except for the fact that it is not necessary to provide an entire front wall for the partitions 71. Therefore, these partitions are provided with a short front wall 77 that extends only up to the offset portion 73 of the next adjacent partition. The upper ends of the partitions 71 and 72 extend up substantially to the top frame members 67 and 68.

The means for directing sheets into the pockets formed by the partitions 71 and 72 comprises a separate framework that rests on top of the framework 18 and is bolted thereto. This framework comprises side frames 78 (Fig. 10) and 79 which have ears (Fig. 7) 80, 81, 82 and 83 thereon. These ears are bolted to the top portion of the framework 18. The side frames are connected to each other by a plurality of cross tie rods 84, there being two of these cross tie rods. A similar cross tie rod 85 connects the side frames 86 and 87 of the framework 20 which is bolted on the framework 18 by means of ears 88 and 89 (Fig. 9).

The side frames 78 and 79 serve to support a plurality of curved plates over each one of the pockets provided by the partitions 71 and 72. The manner of supporting the plate is shown best by reference to Figures 10 and 11 of the drawings. For each pocket there is a front plate 90 and a rear plate 91. The front plate 90 is a sheet metal strip having its top edge bent over as shown best in Figure 11, the top edge being hooked up by a pin 92 provided in each of the side frames 78 and 79. For the front pocket the front plate 90 is carried on the side frames 86 and 87. There is a split pin 93 in each of the side frames to receive the side edge of the plate 90, and thus rigidly position it against displacement. The plates 91 are carried by suitable pins 94 mounted in the side frames 78 and 79. The plates 91 also have their top edges bent over as indicated at 95. In this case the bending is toward the rear so that the chute formed by the plates 90 and 91 will be unobstructed by any sharp edges at its inlet. The plates 91 are maintained in spaced relation to the plates 90 by smaller pins 96 that are provided on the side frames 78 and 79. The plates 91 are held against the pins 96 by small springs 96a that extend between the plates 90 and 91 and are connected to both plates. These springs are shown best in Figures 8 and 10 of the drawings. It is not necessary to provide the springs at both sides of the plates so they are shown merely at one side edge thereof.

Directly over the chutes formed by the plates 90 and 91 I provide directing shoes 97. These shoes are shown in Figure 10 to be spaced apart so that they can move up between the belts of the conveyer 21a without striking the belts. Figure 10 shows that there are a plurality of the shoes 97 and that these shoes are separated by short roller sections 98. The shoes and the roller sections are mounted upon shafts 99 and the shoes are fixed to the shaft while the rollers, of course are free to turn. Each of the shafts extends into suitable bearings 100 on the side frame 78 and bearings 101 on the side frame 79. Individual control levers 102 are provided on the shafts 99. These control levers are fixed to the shaft by means of collars 103 that are keyed or pinned to the shafts in any suitable fashion. The control levers are connected by links 104 to the movable cores 105 of a plurality of solenoids 106. All of the shafts 99, with the exception of the back shaft are connected to solenoids. However, the back shaft has its lever arm 102 normally snapped over and held by a pin 107 which is mounted on the bearing block 53. This is because it is normally unnecessary to close the rear shoes 97 because all of the sheets delivered to the sorter are disposed of by the time the rear pocket is reached.

In order to insure movement of the sheets by the conveyer 21a, I provide spaced shafts 108 and 109 at intervals along the conveyer, and these shafts are placed between the upper and lower portions of the conveyer belts so that they ride on the lower portions. The shafts are provided with enlarged roller sections 110 and 111 for engaging the conveyer belts. Suitable bearing blocks 112 are provided for the shafts 108 and 109. These bearing blocks are open as shown at the top so that the weights of the shafts 108 and 109 are carried directly by the belts, and these shafts can be readily removed whenever it is desirable to remove them.

It is believed to be evident from the foregoing description that sheets delivered from the duplicating device to the throat 29 by the stripping rollers 5, 6 and 7 and the guide plates 27 and 28 may be directed to the conveyers 21 and 22 or lifted off directly by the selecting member 30. A cover plate 113 is placed over the conveyer 21 adjacent to the member 30 so as to receive sheets deflected by the member 30. If the sheets are fed to the conveyers 21 and 22, they will be carried by these conveyers over the shoes 97 that are depressed until they reach a point where the shoes 97 are raised. When this point is reached the sheets will be deflected and turned over by the curved under surface of the shoes 97 and the plates 90 and 91 and dropped in the pocket. Figure 11 shows how a shoe, when raised, has its lower tip 97a moved forward to prevent a sheet from getting beyond the chute plate 91. After one pocket has received all of the sheets that should be placed therein, it can be closed to allow the sheets to pass on to the next pocket.

The chute and pocket construction in this device is such that the individual parts tend to eliminate the catching of sheets thereon. Furthermore, when the sheets fall into the pockets of the partitions 71, they are turned over and properly stacked one upon the other by virtue of the fact that they are directed at an angle to the vertical with the lower edge toward the front of the pocket. The sloping portion 74 at the bottom of each pocket causes the sheets to stack with their higher edges toward the back of the pocket and out of the way of the lower edge of a new sheet coming into the pocket.

Means for selectively opening the shoes 97 by actuating the solenoids 106 is illustrated best in Figures 13 to 20 inclusive. The circuit arrangement is shown in Figure 21. Before describing the detailed construction of the mechanism, I will describe the electrical circuit so that the mechanism will be more clearly understandable when it is described. Figure 21 shows the cam 14 and the switch 15 of the operating mechanism therefor connected in a circuit for controlling the operation of the sorter in conjunction with control of the operation of the duplicating machine itself. A plug 115 is adapted to be connected to a suitable power supply to supply power to the two motors 48 and 62. A switch 116 is provided adjacent to the plug 115 for stopping the operation of the device. One line from the power circuit has a branch 117 that leads to the several solenoids 106. The solenoids have individual leads 118 that lead to selector units 119 and then to a common line 120 to the other side of the power circuit. The side of the power circuit that is common to the several solenoids over the lead 117 also has a lead 121 that extends to a switch 122 and a plug 123 that is connected to the switch 15 by means of a socket 124. The line continues from the switch 15 over a lead 125 and a lead 126 to another solenoid 127 which is adapted to be actuated, in response to the closings of the switch 15 and openings thereof, to step the plunger 128 of the solenoid 127 along a series of control discs 129. These control discs are mounted on a shaft 130 and operate in a manner which will now be described.

The control mechanism above referred to is shown by Figure 1 of the drawings to be mounted upon a stand 131 and enclosed in a casing 132. The casings rests upon pedestals 133 and is coupled to the duplicating machine and sorter only by the cable connections indicated at 134. Within the casing 132 the shaft 130 is mounted upon two frame pieces 135 and 136 by suitable bearing bushings 137 and 138. The first selecting disc 129 is fixed on the shaft 130, but the several other discs which are arranged in groups are not so fixed. Referring to Figure 20 of the drawings, the discs are shown as mounted upon a hub portion 139 which is keyed to the shaft 130, but the discs are frictionally held against rotation on the hub 139 by a series of friction washers 140 inserted between the discs. Each of the hubs 139 carries a number of the discs 129, the number shown being six.

Figures 16 to 20 inclusive illustrate best how the discs act as a means of holding the plunger 128 of the solenoid 127 in accordance with the desired selection of the operator. However, in order to understand the functioning of the discs, it must first be pointed out that means are provided to move the solenoid 127 lengthwise of the casing and to thereby effect selective closings of circuits for the solenoids 106. The solenoid 127 is shown in Figures 13 and 14 as being slidably mounted upon two rails 141 by a base portion 127a. The portion 127a carries a spring 142 with a roller 142a at its free end. The roller rides against the lower surface of a bar 143 that is carried by the frame pieces 135 and 136. The solenoid 127 carries a cam shoe 144 which is adapted to engage a roller 145 that is provided on a closing lever 146 of each of the control switches 119. There is one of the control switches 119 for each of the solenoids 106. The electrical arrangement is such that when the cam shoe 144 engages a roller 145 it keeps the switch 119 closed for a distance of travel of the solenoid 127 equal to the length of one of the groups of the discs 129. Means to move the solenoid 127 comprises a cable 147 which extends out to a pulley 148 mounted on the casing and extending through an opening in the bottom thereof. The cable then extends over a pulley 149 which is mounted in suitable brackets on the bottom of the casing and at its lower end the cable carries a weight 150 (Fig. 1). Any equivalent mechanism may of course be used to control the movement of the solenoid 127.

The several discs 129 that are frictionally connected together on the hubs 139 are provided with notches as shown at 151 in the periphery thereof. These notches are sufficiently wide to allow the tip of the plunger 128 (Fig. 18) of the solenoid 127 to pass through them. Each disc has an arm 152 thereon, and this arm is connected by a spring 153 to a bar 154 which is mounted in the casing. The several discs 129 can be moved back in staggered relation as shown in Figure 19 by means of a hand lever 155. This hand lever is connected to a ring 156 which is pivoted on the hub 139. The extreme left hand disc 129 of each group has a small pin 157 thereon, and this pin fits in a notch 158 of the ring 156. The left hand disc 129 of each group has a circular lug 159 on the right hand side thereof (see Figure 16). Each of the succeeding discs, except the last one in a series, also has a lug 159 thereon. The several discs after the first one of a series have lugs 160 on the left hand side thereof as illustrated in Figure 16. In normal resting position of the discs they are positioned by the springs 153 so that the notches 151 therein are aligned with the member 128. However, when the hand lever 155 is pulled down from the position shown in Figure 18 to the position shown in Figure 19, the left hand discs 129 of Figure 16 will be displaced as far as the hand lever is moved. The second disc will be displaced only after the lug 159 on the first disc engages the lug 160 on the second disc. The third disc will be displaced when the lug 159 on the second disc engages the lug 160 on the third disc.

The hand levers 155 project through slots 161 that are provided in the casing wall. In order to latch the levers in any desired position, there is a bar 162 mounted inside the opening 161 and provided with teeth 163 under which the hand lever 155 may be caught to hold the hand lever in adjusted position against the pull of the springs 153.

In order that the operation of the device may be followed a sequence of operations covering the filling of one pocket of the sorter with the desired number of sheets will be described. It will be assumed that the duplicating machine is ready for operation and that the plugs 115 and 123 of Figure 21 have been connected. Also it will be assumed that the left hand lever 155 in Figure 17 has been moved down until it is caught under the tooth 163 corresponding to the numeral 2. The second lever has not been pulled down at all, but the third lever 155 has been pulled down to a point where it is engaged in the lowest notch. This actually means that the operator has set the operating device to place two sheets in the first pocket 72 of the sorter and to place no sheets in the second pocket. He has set the device to place a full load of six sheets in the third pocket. When the switches 116 and 122 are closed the machine is ready for operation. The duplicating machine is then actuated and the initial operation causes the solenoid 127 to retract its plunger 128 when the cam point 17 engages the cam roller on the switch 15. When the plunger 128 is retracted, this releases the carriage on which it is mounted for travel in response to the pull of the cable 147. As the carriage travels to the right as shown in Figure 13, the contact operating cam roller 145 rides up on the cam 144 and closes a switch 119 to energize the solenoid 106 which is controlling the shoes at the first pocket of the sorter. The solenoid 106 will raise the shoes so that the first pocket is ready to receive copies.

The motors 48 and 62 are of course connected directly so that the conveyers are driven continuously. When the sheet is delivered to these conveyers in response to the first operation of the duplicating machine, the conveyers carry the sheet into position to drop into the pocket where the shoes are open. When the duplicating machine makes its cycle of operation to produce a second copy, the plunger 128 is retracted again. It will be noted that the retraction of this plunger is only momentarily to enable it to pass over a tapered edge of a disc 129. The single disc 129 provided at the extreme left of the series of discs shown in Figure 16 is a preparatory unit to permit the duplicating machine to perform a single first operation for applying the master sheet, or if the master was previously applied, this step may be used to make a copy sheet that will be examined by the operator and thrown away or later placed in one of the pockets as desired. This initial copy sheet and the master sheet may be recovered very easily by closing the deflector 30 down in front of the slots 29 as shown in the dotted line position of Figure 5 of the drawings.

Each time the duplicating machine makes an operative cycle the plunger 128 is retracted to pass over one of the discs 129. If the lever 155 is held by the tooth 163 opposite the member 2 as illustrated in Figure 17, this means that the two left hand discs 129 have been turned to bring the notches 151 thereof out of alignment with the plunger 128 so the plunger will have to step over these two discs while the solenoid 106 is held energized by the switch 119 due to the cam roller 145 riding on the cam 144. When the second copy is made by the duplicating machine, the plunger 128 then fits in the notches 151 of the next four discs with it. Therefore, the solenoid 127 continues to move to the right until it is in position to engage the second series of discs 129. These discs however, have been left with their notches 151 in alignment with the plunger 128 so the solenoid is moved to the third group of discs. The switch 119 associated with the second set of shoes is temporarily closed, so while the roller 145 passes over the cam 144 the solenoid 106 coupled to the second set of shoes controlling entrance of a copy sheet to a pocket will be momentarily closed. However, the momentary opening of the shoes does no harm because they are again closed before the next sheet from the duplicator arrives over the sorter pockets.

According to the assumption made at the beginning of this description of operations, the third set of discs 129 have been so adjusted that all of the notches 151 therein are out of alignment with the plunger 128. When the plunger 128 reaches this third set of discs it is necessary for it to be retracted six times by the solenoid 127 in order to clear all the discs. This means that the switch 15 will be closed six times directing six copies from the duplicating machine to the third sorter pocket. In this way the operator can determine in advance the number of sheets going into a particular pocket.

It will be noted in Figure 14 of the drawings that the solenoid 127 has a hand lever 164 fixed thereon and projecting up through the casing. This hand lever is for the purpose of manually moving the solenoid when desired. The advantage of the manual adjustment may be explained as follows: Assuming that the operator after having once made a set-up finds it necessary to place more copies in a particular pocket that has already been passed. He returns the solenoid 127 to the set of discs controlling the shoes over that particular pocket and resets the lever 155 for the number of additional copies desired. The operation will then continue just the same as if the setting had originally been made. When a complete run has been made the hand piece 164 can be used to return the solenoid 127 to its original starting position.

The several discs are of course provided with the individual springs 153 so that they will be individually returned to starting position when the lever 155 is returned to position to align the slot in the first disc with the plunger 128. As a safety measure, I also provide for each bank of discs a return bar 165 that extends across all of the arms 152 so that all of these arms can be returned to neutral position by the bar in the event the spring on one of them fails to return it. Springs 166 are used for operating the bars 165. The bars 165 are provided with an offset portion 167 which is welded upon the arm 152 of the first disc of each bank of discs 129.

Referring now to the form of the invention illustrated in Figures 22 to 28 inclusive, this form of the invention is a modified control unit for accomplishing much the same results as that accomplished by the control unit illustrated in Figures 13 to 21 inclusive. By reference to the wiring diagram in Figure 28, I will describe the electrical features of the control unit and then describe the detailed operation of the mechanism by which the electrical operations are controlled. The solenoids 106 are shown as having one terminal thereof connected by a common lead 170 to one side of a source of electrical energy. Each of the solenoids has a separate lead 170a which connects it to one terminal 171a of a switch 171. The switches 171, of which there are ten in the set-up shown, are so connected that they are in parallel. These switches are provided with three terminals 171a, 171b, and 171c as shown in Figure 28 and the connections are such that when one of the outer terminals is electrically connected through the switch to the center terminal the other outer terminal is disconnected from the center terminal. The leads 172 between the switches supply current from a common lead 175 to the central terminals 171b of the several switches when the contacts electrically connect the back terminals 171c to the center terminals. The duplicating machine cam 17 and the switch 15 controlled thereby are interposed in a branch line 176 leading from the main supply line 170. This branch line also contains a hand switch 177. The branch line has a plurality of taps 178 leading to individual solenoids 179 that operate the selector mechanism to determine how many sheets will be delivered into a particular pocket when a solenoid 106 is holding that pocket open. The solenoids 179 have their return leads 180 connected to the terminals 173a of another set of switches 173 like the switches 171. A plurality of leads 174 establish connection for the terminals 173b and 173c of the switches to the power lead 175.

The operation of the circuit is substantially as follows: Let us assume that the upper switches 171 and 173 in the diagram shown are closed so as to connect current from the lead 175 through the leads 172 and 174 to the terminals 171b and 173b of these switches. This means that current is supplied from the source over the leads 170, 170a, the switches 171, the leads 172 and the lead 175 to energize a solenoid 106, the particular solenoid to be energized being the top one in Figure 28. Now if the switch 15 is plugged into the circuit so that the branch line 176 is completed, and if the switch 177 is in closed position, the branch line 176 will supply current through the tap 178 to the top one of the solenoids 179, return being over the lead 180 from this solenoid to the switch 173. So long as the circuit for the solenoid 106 remains closed by the switch 171 the solenoid will hold the pocket it is associated with open, but each time the switch 15 is closed while the switch 173 is operated the solenoid 179 will also be operated momentarily. This last solenoid acts as the counter to toll off the number of operations of the duplicating machine during which the pocket, that is associated with the upper solenoid 106, is held open. If the switch 177 is open while the switch 171 is closed, the counting stops because the solenoid 179 is no longer operated. Thus it is possible for the operator to keep any pocket of the sorter open to receive as many sheets as he desires by the simple operation of throwing the hand switch 177 to open position while that pocket is held open by its solenoid 106. The particular mechanism by which the solenoid 179 controls the switches 171 and 173 will be described more in detail hereinafter.

At the time of supplying a master sheet to the duplicating machine it is desirable to have the master sheet remain on the drum for at least one rotation. This is accomplished in accordance with the present invention by using a solenoid 181 to control the stripper roller 7 so as to hold it out of stripping position for one or more rotations of the drum. The solenoid 181 has one terminal connected by a lead 182 to the power lead 175. The other terminal of the solenoid is connected by a lead 183 to an extra switch 173' in the series of switches. This extra switch has a lead 184 to the other side of the power line. Thus if the switch 173' is closed, the solenoid 181 will be energized to prevent the stripping roller 7 from entering the drum in the usual fashion so that a master sheet may be held on the drum. The switch 173' preferably is manually operated.

Referring now to the mechanism by which the switches 171 and 173 are controlled, this mechanism comprises a control casing 185 having a multiplicity of slots 186 in one face thereof and into which a plurality of push type re-set levers 187 are guided. Each of the slots 186 has a strip 188 secured to the casing alongside it so as to show the setting of the lever 187. The casing 185 has companion slots 189 parallel to the slots 186, and these slots are provided to receive individual levers 190 by which the switches 171 and 173 can be manually controlled independently of the pre-selecting mechanism.

A pair of switches 171 and 173 is held closed for a number of rotations of the duplicating drum determined by the setting of the lever 187 that is associated with them. The mechanism by which the levers 187 determines the number of rotations during which their associated switches remain closed is shown best in Figures 23 to 27 inclusive. The casing 185 has a floor plate 192 upon which there are spaced shaft supporting standards 191. Each standard has a series of ratchet teeth 193 corresponding in number to the indications on the strip 188. The levers 187 carry spring pressed pawls 194 to engage the ratchet teeth 193. The construction of the levers 187 is such that by pushing inwardly on the handle of the lever 187 the operator can lift the pawl 194 and raise the lever any time that he desires to do so. Of course, on the downward adjustment of the levers a pawl will ride over the teeth 193.

Each of the standards 191 is apertured to receive a hub 195 in which a shaft 196 is rotatably mounted. The shaft 196 shown at the extreme right of Figure 25 and shown in the sectional view of Figure 26 is somewhat longer than the other shafts 196 and carries an additional disc for a purpose which will be pointed out later. Except for the above difference all of the hubs 195 carry like shafts 196. The shaft 196 is flattened on its opposite sides as indicated at 197 to receive a disc 198. Also at the other end of the hub the shaft 196 is flattened on the side as indicated at 199 to receive a ratchet wheel 200. The ratchet wheel 200 is engaged by a pawl 201 which is pivoted upon the free end of a bell crank lever 202 which is mounted upon a reduced cylindrical portion 203 of the shaft 196. A washer 204 is placed over the lever 202 and a screw 205 holds the washer and the bell crank lever in place. The pawl 201 is held down on the ratchet wheel by a spring 206, one end of which is fastened to a pin 207 on the pawl 201, and the other end of which is fastened to a pin 208 on the depending portion of the bell crank lever 202. This depending portion of the bell crank lever is bifurcated as indicated at 209, to engage a pin 210 which connects two bars 211 that are carried by the movable core of the solenoid 179. A spring 212 also is connected to the pin 210 and to a flange 213 on the floor plate 192 so as to normally oppose the operation of the solenoid 179. Alternate solenoids 179 are set back away from the standards 191 on a raised platform 214 that is provided on the floor plate 192. On these set back solenoids the bars 211 are not extended all the way to the crank arm 202. A link 215 is used to couple the pin 210 to the crank arm.

The disc 198 is normally urged to rotate the shaft 196 in a clockwise direction as shown in Figures 23 and 27 by a spring 216, one end of which is secured upon a pin 216a on the disc, and the other end of which is secured to a flange 192a at the rear edge of the plate 192. Each of the discs 198 has a projecting portion 217 which is turned toward the lever 187 and engaged underneath this lever. The lever of course is journalled on the hub 195 and may be set in any of the positions indicated by the numbers on the strips 188. The shaft 196 however, is held against following the lever 187, when it is raised, by a spring pressed pawl 218 which is pivoted at 219 to the standard 191 and which is held down by a spring 220 connecting it to the flange 213. The pawl 218 is limited as to movement toward the ratchet wheel 200, which is non-rotatable on the shaft 196, by a pin 221 in the standard 191. The standard 191 also has a pin 222 thereon which holds the pawl 201 away from the ratchet wheel for a part of its travel so as to limit the stroke of the ratchet wheel.

In the discs 198 I provide notches 224. These notches are to provide seats for pins 223 that are secured to switch operating levers 225. These switch operating levers are pivoted at 226 on the standards 191, and they carry laterally extending lugs 227 for engagement with push buttons 228 on the associated switches 171 and 173. The switches 171 and 173 are bolted in pairs to the standards 191. The levers 225 have hand pieces 190 thereon so that the switches 171 and 173 can be closed by hand when the pins 223 are resting in the notches 224.

The extreme right hand shaft 196 as shown in Figure 25 has an additional disc 198' mounted thereon. This disc is arranged to operate the switch 173' by means of a short lever 229 which is pivoted upon an auxiliary standard 230. The disc 198' serves to close the switch 173' at the beginning of each run of duplicating so that a master sheet placed on the duplicating drum may be held thereon for a plurality of the revolutions of the duplicating drum before it is stripped. This feature of the machine is for use particularly with the gelatin pad type of duplicator. The number of revolutions that the master sheet will remain on the drum before being stripped is determined by the setting of the first adjacent lever 187.

When it is desired to release the ratchet wheels 200 so as to permit all of the discs to move up until they bring the portions 217 against their respective levers 187, I provide a release bar 231 which is pivoted at the opposite ends on two standards 232 which are mounted on the floor plate 192. A finger piece 233 is connected to the bar 231 so that the bar can be lifted against the pawls 218 to release them from the ratchet wheel 200. It is believed to be evident that when the pawls 218 are released from the ratchet wheels 200, each of these wheels will be rotated along with the discs 198 until the projections 217 on the respective discs are in engagement with the associated levers 181. Thus it is possible for an operator to pre-set the levers 181, then check his setting and see that everything is correct before he releases the discs 198 to close all of the switches 173.

When the No. 1 switch of the 171 group is closed it energizes the No. 1 solenoid 106 of the sorting device to open the first pocket. As fast as the projection 17 on the cam is rotated by the duplicating machine it closes the switch 15. Then the associated No. 1 solenoid 179 will be energized and de-energized over the conductors 176, 178 and 180. At each energization of each solenoid 179 the bell crank lever 202 will be operated to effect a partial rotation of the disc 198 toward neutral position where the notch 224 thereon will receive the pin 223 on the associated switch lever 225. For example, if the lever 187 were set in alignment with the numeral 8 on the marketing strip 188, it would take eight energizations of the associated solenoid 179 to move the disc 198 into position to open the switch associated with that disc. This would mean that eight complete duplicating operations would be carried out. If, after a run is finished the operator is not sure of the correctness of his selection, he can re-check the levers 187 because they are not moved by the operation of the solenoids 179 and the supplying of the pockets of the sorter with the requisite number of copies. A single set-up thus may serve for a great number of duplicating runs where the material to be run must have the same number of copies made and sorted in the same number of pockets. This is often the case where adequate keeping of records and copies necessitate making from 25 to 50 copies.

When the No. 1 switch of the 171 and 173 series is again opened by the notch 224 in the associated disc being moved around to align with the pin 223 on its associated lever 225, the associated solenoid 106 will be de-energized to allow the corresponding pocket to close. Opening of the No. 1 switches connects power from the lead 175 to the No. 2 switches 171 and 173 over the leads 172 and 174 respectively, and the second solenoid in the series will hold its pocket open until the requisite number of copies have been placed therein. This operation will continue uninterrupted to the end of the setting unless the operator desires a re-set or wishes to go back and place more copies in an individual pocket. Should the operator desire to do so he can close any individual solenoid circuit that has already been passed by merely lifting up on the hand lever 190 for that particular solenoid. Thus the device has sufficient flexibility to take care of emergency number of copies needed for any particular purpose without in any way detracting from its full automatic operation in connection with the duplicating machine.

The sorter is not limited to use with a duplicating machine. It can be hand fed beneath the plate 30 when the plate is in raised position as shown in Figure 5. The pockets may be opened by using the levers 190, or if some other delivering means is used, it can be connected in circuit with the switch 15 to effect actuation of the switch each time a sheet is delivered. The device will sort all sizes from small cards to the full size afforded by the pockets. For example, the machine shown takes all sizes up to 14 inch by 17 inch sheets.

From the foregoing description it is believed evident that the nature and advantages of my invention will be clear to those skilled in this art.

Having thus described my invention, I claim:

1. In a collecting device of the character described, a first conveyor comprising upper and lower conveyor belts between which sheets are fed, said lower belt extending forwardly of said upper belts, a framework having a series of pockets for receiving sheets, and having a top surface onto which sheets are delivered by said first conveyor, a second conveyor comprising spaced belts riding on said top surface, a shaft, a plurality of rollers on said shaft, alternate rollers being engaged by the upper conveyor belts of said first conveyor and the intermediate rollers being engaged by the belts of said second conveyor whereby said second conveyor extends beyond the discharge end of the lower conveyor belt of the first conveyor, and means for directing sheets into said pockets.

2. In a collecting device for collecting sheets in desired groups, a framework, a series of pockets in said framework, gates above the pockets, means to open and close the gates, and means beneath the gates operable to cause the sheets to turn over as they pass downwardly, said means including extensions on the gates extending downwardly and curved to present a concave surface to sheets advancing through the gates, and a pair of curved plates spaced from each gate, said plates being curved in the same general direction as said gate extensions and spaced apart farther at their gate adjacent ends than at their ends remote from the gate whereby to define a curved passageway for guiding sheets.

3. A collecting device for collecting sheets as they are discharged from a copy making device such as a duplicating machine, said device comprising a support across which the sheets are advanced by the copy making device, a conveyor extending from said support, pockets for receiving sheets from the conveyor, and means providing a tapered throat on said support for catching wrinkled or torn sheets before they reach the conveyor.

4. A collecting device for collecting sheets as they are discharged from a copy making device such as a duplicating machine, said device comprising a support across which the sheets are advanced by the copy making device, a conveyor extending from said support, pockets for receiving sheets from the conveyor, a guide plate over said support, said guide plate being spaced from the support and angularly disposed with respect to the support to provide a tapering throat to catch wrinkled or torn sheets.

ALFRED E. LITTLE.

REFERENCES CITED

The following references are of record in the file of this patent:

(References on following page)

UNITED STATES PATENTS

| Number | Name | Date |
|---|---|---|
| 867,684 | Thomas | Oct. 8, 1907 |
| 1,063,338 | Duncan | June 3, 1913 |
| 1,086,167 | Hall | Feb. 3, 1914 |
| 1,282,626 | Powers | Oct. 22, 1918 |
| 1,307,681 | Lasker | June 24, 1919 |
| 1,762,286 | Wood | June 10, 1923 |
| 1,823,042 | Hartmann | Sept. 15, 1931 |
| 1,985,211 | McBean | Dec. 18, 1934 |
| 2,076,700 | Bryce | Apr. 13, 1937 |
| 2,241,168 | Truitt et al. | May 6, 1941 |
| 2,300,029 | Williams | Oct. 27, 1942 |
| 2,306,044 | Davidson | Dec. 22, 1942 |
| 2,367,416 | Matthews | Jan. 16, 1945 |

FOREIGN PATENTS

| Number | Country | Date |
|---|---|---|
| 502,109 | Germany | July 9, 1930 |
| 121,807 | Austria | Mar. 10, 1931 |